United States Patent
Lin et al.

(10) Patent No.: US 8,143,840 B2
(45) Date of Patent: Mar. 27, 2012

(54) DEVICE FOR CONTROLLING INDUCTION MOTOR

(75) Inventors: You-Ren Lin, Taipei Hsien (TW); Rong-Cong Hung, Taipei Hsien (TW); Shen-An Chen, Taipei Hsien (TW); Rong-Hwang Horng, Taipei Hsien (TW); Shih-Chang Chen, Taipei Hsien (TW); Yaw-Shen Lai, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 686 days.

(21) Appl. No.: 12/334,537

(22) Filed: Dec. 15, 2008

(65) Prior Publication Data

US 2010/0097028 A1   Apr. 22, 2010

(30) Foreign Application Priority Data

Oct. 22, 2008   (CN) .......................... 2008 1 0305092

(51) Int. Cl.
*H02P 27/00* (2006.01)
(52) U.S. Cl. ........ 318/812; 318/807; 318/808; 318/811; 318/801
(58) Field of Classification Search .................. 318/599, 318/159, 40, 727, 801, 805, 807, 808, 811, 318/812, 436
See application file for complete search history.

(56) References Cited

U.S. PATENT DOCUMENTS

| | | | | |
|---|---|---|---|---|
| 4,525,660 A | * | 6/1985 | Katto | 318/798 |
| 4,785,225 A | * | 11/1988 | Horie et al. | 318/811 |
| 4,900,992 A | * | 2/1990 | Sekizawa et al. | 318/135 |
| 5,231,339 A | | 7/1993 | Kishimoto et al. | |
| 5,248,926 A | * | 9/1993 | Kotake et al. | 318/807 |
| 5,325,036 A | * | 6/1994 | Diethert et al. | 318/802 |
| 5,677,610 A | * | 10/1997 | Tanamachi et al. | 318/801 |

FOREIGN PATENT DOCUMENTS

CN   1055266 A   10/1991

\* cited by examiner

*Primary Examiner* — Walter Benson
*Assistant Examiner* — Thai Dinh
(74) *Attorney, Agent, or Firm* — Altis Law Group, Inc.

(57) ABSTRACT

A device for controlling an induction motor includes a voltage/frequency controller, a pulse width modulation controller, and a converter. The voltage/frequency controller receives a controlling frequency, and outputs a controlling voltage corresponding to the controlling frequency. The pulse width modulation controller receives the controlling voltage and the controlling frequency, and generates PWM signals according to the controlling voltage and the controlling frequency. The converter receives the PWM signals, and controls the induction motor according to the PWM signals. There is a predetermined relationship between the controlling voltage and the controlling frequency stored in the voltage/frequency controller. The controlling voltage is greater than zero in response to the controlling frequency being zero, and increasing the controlling frequency increases the controlling voltage as in the predetermined relationship.

12 Claims, 3 Drawing Sheets

DEVICE FOR CONTROLLING INDUCTION MOTOR

BACKGROUND

1. Technical Field

Embodiments of the present disclosure relate to controlling devices, and particularly to a device for controlling an induction motor.

2. Description of the Related Art

Induction motors, a type of alternative current (AC) motors, are able to convert electrical energy into mechanical energy and output it via rotors of the motors. Currently, induction motors are favored over direct current (DC) motors as driving equipment due to the ability to accurately control parameters of the induction motors, such as the speed and the torque of the induction motors. However, the peak torque of the induction motors may fall off when the induction motors work at a low rotation speed, which causes shortages in available mechanical energy.

What is needed, therefore, is to provide a device for controlling induction motors to overcome the above-mentioned shortcoming.

DETAILED DESCRIPTION

Figure 1:
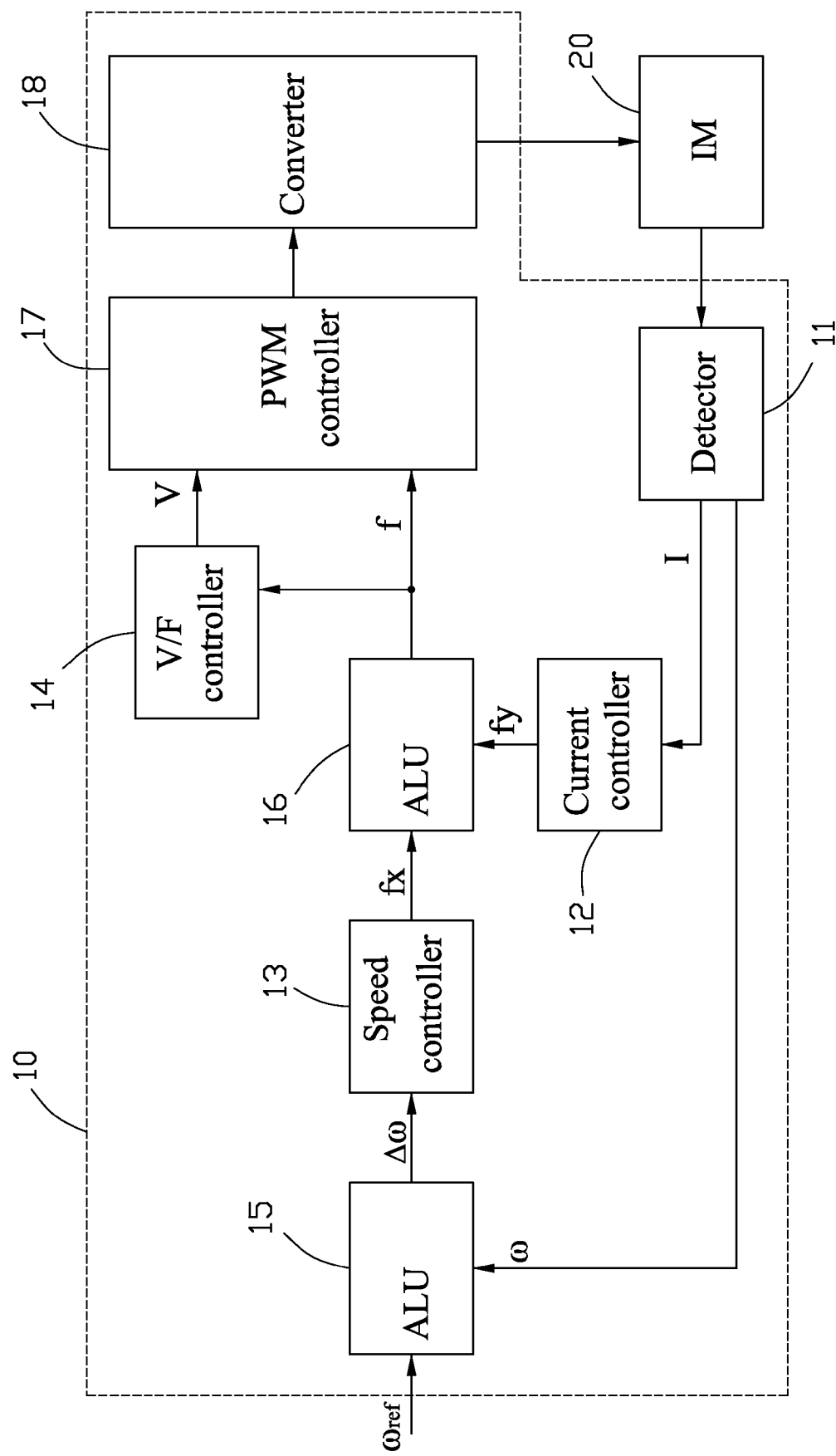
FIG. 1 is a step diagram of one embodiment of a device connected to an induction motor (IM) to be controlled, the device including a voltage/frequency (V/F) controller.

Referring to FIG. 1, a device 10 for controlling an induction motor (IM) 20 connected to the device 10 includes a detector 11, a current controller 12, a speed controller 13, a voltage/frequency (V/F) controller 14 that converts a frequency to a voltage, two arithmetic logic units (ALU) 15 and 16, a pulse width modulation (PWM) controller 17, and a converter 18. An input of the detector 11 is connected to an output of the IM 20. A speed output of the detector 11 is connected to a first input of the ALU 15. A current output of the detector 11 is connected to a first input of the ALU 16 via the current controller 12. The speed controller 13 is connected between an output of the ALU 15 and a second input of the ALU 16. An output of the ALU 16 is connected to a first input of the PWM controller 17, and an input of the V/F controller 14. An output of the V/F controller 14 is connected to a second input of the PWM controller 17. An output of the PWM controller 17 is connected to an input of the converter 18. An output of the converter 18 is connected to an input of the IM 20.

The detector 11 detects the current I and the speed ω of the IM 20. The ALU 15 receives the speed ω of the IM 20 by the first input of the ALU 15, and receives an instruction speed $\omega_{ref}$ by a second input of the ALU 15. A speed difference Δω is obtained by subtracting the speed ω from the instruction speed $\omega_{ref}$ by the ALU 15. The speed controller 13 receives the speed difference Δω, and outputs an instruction frequency fx to the second input of the ALU 16 according to the speed difference Δω. The current I of the IM 20 is fed back to the current controller 12. The current controller 13 outputs an adjusting frequency fy to the first input of the ALU 16 according to the current I of the IM 20. A controlling frequency f is obtained by subtracting the adjusting frequency fy from the instruction frequency fx by the ALU 16, and outputted to the V/F controller 14 and the PWM controller 17 from the ALU 16. The V/F controller 14 outputs a corresponding controlling voltage V to the PWM controller 17 according to the received controlling frequency f. The PWM controller generates PWM signals to the converter 18. The converter 18 controls the parameters of the IM 20 according to duty cycles of the PWM signals. Values of the duty cycles of the PWM signals are set by the PWM controller 17 according to the controlling voltage V and the controlling frequency f.

There is a threshold current value stored in the current controller 12, for comparing with the current I fed back from the IM 20. In one embodiment, the current controller 12 outputs the adjusting frequency fy to reduce the controlling frequency f, which reduces the current of the IM 20, to keep the IM 20 from being damaged or destroyed by an over current when the value of the current I is greater than the threshold current value. The adjusting frequency fy is equal to zero when the value of the current I is lower than the threshold current value.

Figure 2:
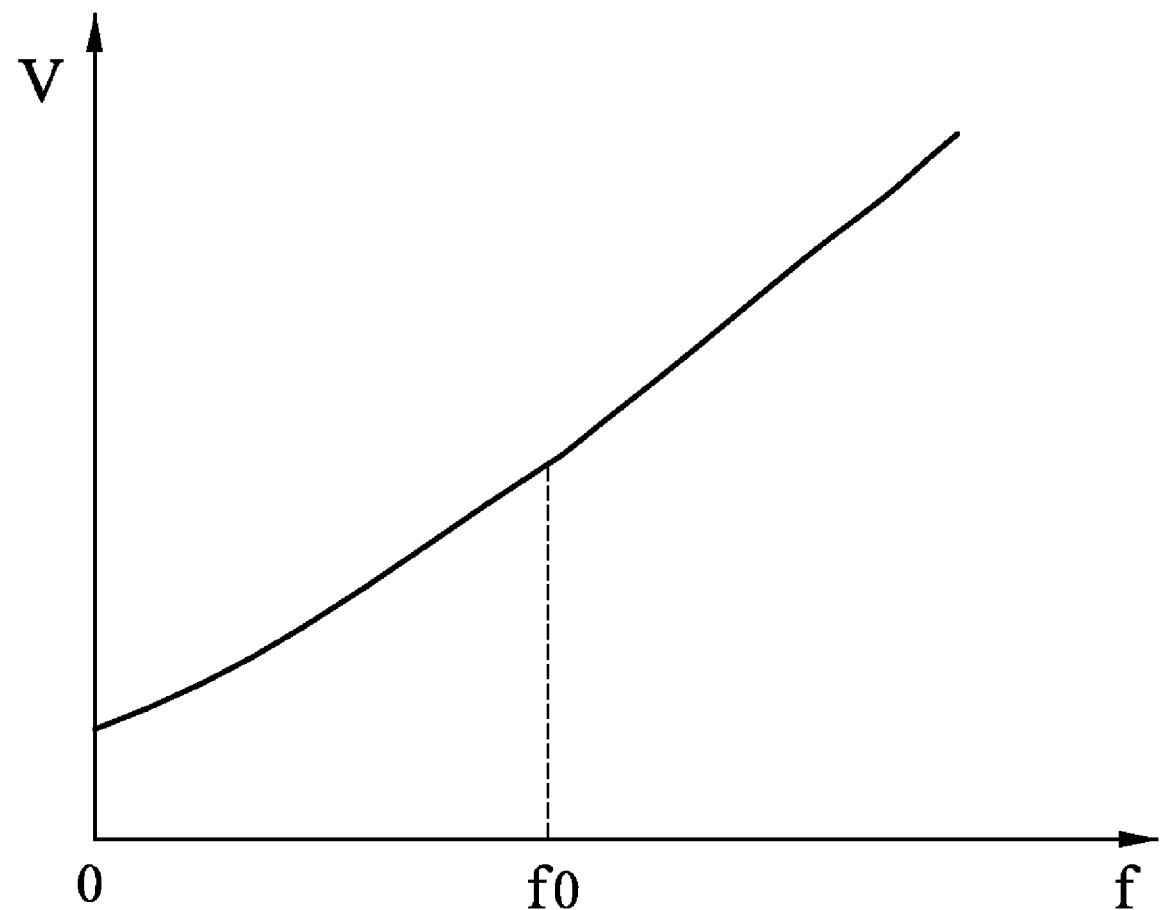
FIG. 2 is a curve diagram to illustrate the relationship between the voltage and the frequency of the V/F controller of FIG. 1.

The torque of the IM 20 can be raised by providing more current, give more voltage to the IM 20. Referring to FIG. 2, there is a relationship between the controlling voltage V and the controlling frequency f stored in the V/F controller 14. The V/F controller 14 outputs a corresponding controlling voltage V when it receives the controlling frequency f, according to the relationship illustrated by the curve in FIG. 2. The controlling voltage V is greater than zero, instead of zero, in response to the controlling frequency f being zero. The controlling voltage V increases when the controlling frequency f is increased. The ratio of the controlling voltage V to the controlling frequency f is not constant when the controlling frequency f is lower than a given frequency value f0, but is constant when the controlling frequency f is greater than the given frequency value f0. The relationship as illustrated in FIG. 2 provides a greater ratio of the controlling voltage V to the controlling frequency f than a linear relationship at point 0 of FIG. 2. Therefore, the V/F controller 14 outputs a greater controlling voltage V when the value of the corresponding controlling frequency f is lower than the given frequency value f0, to keep the torque of the IM 20 from being reduced when the IM 20 works at a low speed, and a high performance of the IM 20 is thus obtained.

Figure 3:
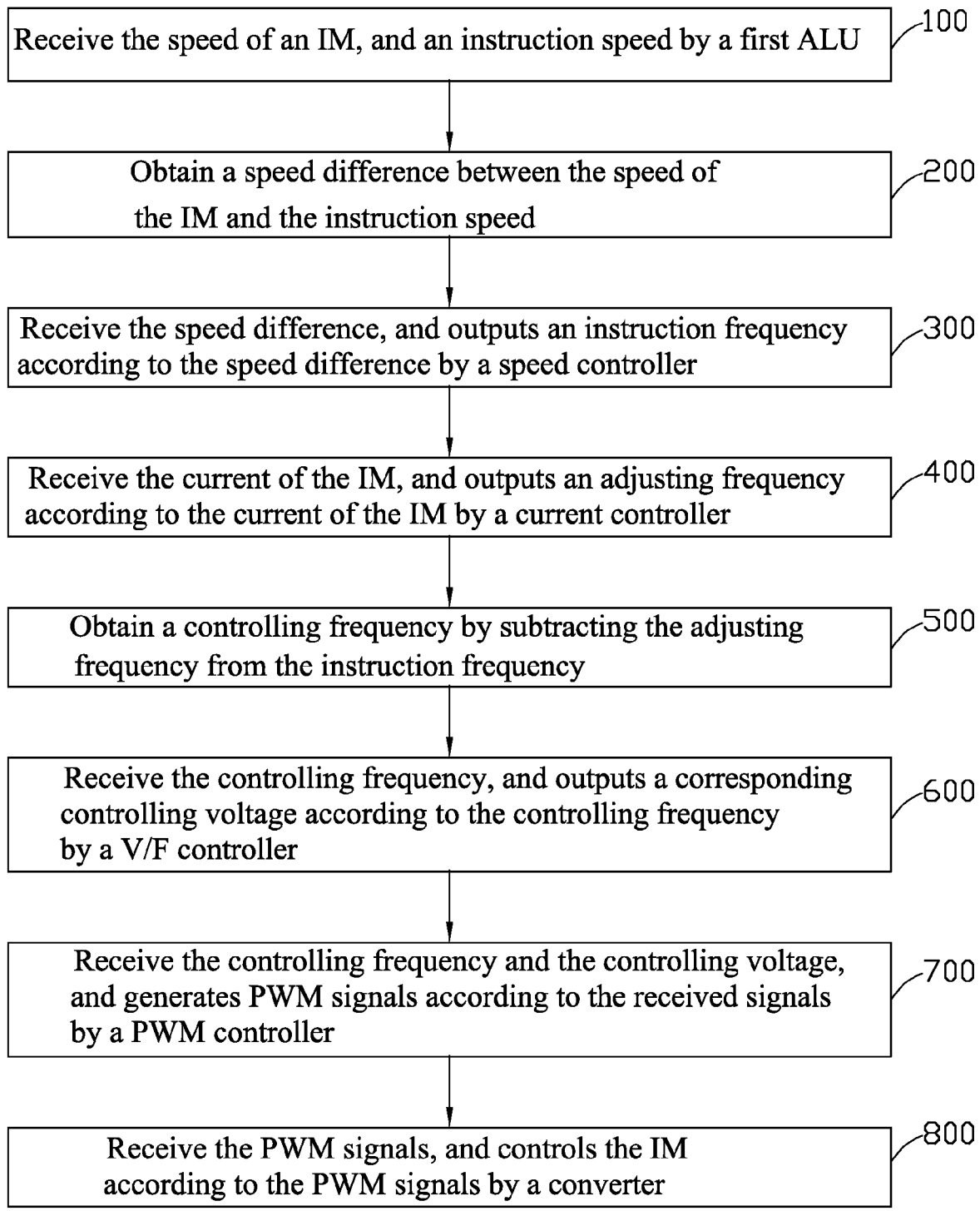
FIG. 3 is a flowchart of one embodiment of a method for controlling the IM of FIG. 1.

Referring to FIG. 3, one embodiment of a method for controlling the IM 20 is used in the device 10.

In step 100, the ALU 15 receives the speed ω of the IM 20 detected by the detector 11, and the instruction speed $\omega_{ref}$.

In step 200, the ALU 15 subtracts the speed ω from the instruction speed $\omega_{ref}$ to obtain the speed difference Δω.

In step 300, the speed controller 13 receives the speed difference Δω, and outputs the instruction frequency fx according to the speed difference Δω.

In step 400, the current controller 12 receives the current I of the IM 20 detected by the detector 11, and outputs the adjusting frequency fy according to a comparing result of the current I and the threshold current value.

In step 500, the ALU 16 receives the instruction frequency fx and the adjusting frequency fy, and subtracts the adjusting frequency fy from the instruction frequency fx to obtain the controlling frequency f.

In step 600, the V/F controller 14 receives the controlling frequency f, and outputs the corresponding controlling voltage V according to the controlling frequency f.

In step 700, the PWM controller 17 receives the controlling frequency f and the controlling voltage V, and generates PWM signals. The values of the duty cycles of the PWM signals are set by the PWM controller 17 according the controlling voltage V and the controlling frequency f.

In step 800, the converter 18 receives the PWM signals, and controls the parameters of the IM 20 according to the duty cycles of the PWM signals.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skills in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A device for controlling an induction motor (IM) comprising:
   a voltage/frequency (V/F) controller configured to receive a controlling frequency, and output a corresponding controlling voltage according to a predetermined relationship of the controlling voltage rising with the increasing of the controlling frequency;
   a pulse width modulation (PWM) controller configured to receive the controlling voltage and the controlling frequency, and generate PWM signals according to the controlling voltage and the controlling frequency;
   a converter configured to receive the PWM signals, and control the IM according to the PWM signals;
   a first arithmetic logic unit (ALU) configured to receive an instruction frequency and an adjusting frequency, wherein the controlling frequency being obtained by subtracting an adjusting frequency from the instruction frequency by the first ALU; and
   a speed controller and a second ALU, wherein the speed controller is configured to output the instruction frequency according to a speed difference worked out by the second ALU;
   wherein the V/F controller is configured for outputting a controlling voltage greater than zero in response to the controlling frequency being zero, and increasing a controlling voltage in response to an increased controlling frequency as in the predetermined relationship.

2. The device of claim 1, wherein the speed difference is a result by subtracting an instruction speed received by the second ALU and a speed of the IM fed back by a feed back device connected to the IM.

3. The device of claim 2, wherein the feed back device is a detector configured to detect the speed and the current of the IM.

4. The device of claim 3, further comprising a current controller configured to receive the current of the IM, and output the adjusting frequency to the first ALU according to the current of the IM.

5. The device of claim 4, wherein the current controller stores a threshold current value, is further configured to compare the threshold current value with the current of the IM, and outputs an adjusting frequency of zero value in response to the value of the current I being lower than the threshold current value, and an adjusting frequency of greater than zero value in response to the value of the current I being greater than the threshold current value.

6. The device of claim 1, wherein the V/F controller stores a given frequency value, the predetermined relationship is non-linear in response to the controlling frequency being lower than the given frequency value, and is linear in response to the controlling frequency being greater than the given frequency value.

7. A device for controlling an induction motor (IM) comprising:
   a voltage/frequency (V/F) controller configured to output a controlling voltage corresponding to a controlling frequency received by the V/F controller;
   a pulse width modulation (PWM) controller configured to receive the controlling voltage and the controlling frequency, and generate PWM signals according to the controlling voltage and the controlling frequency; and
   a converter configured to receive the PWM signals, and control parameters of the IM according to the PWM signals;
   a first arithmetic logic unit (ALU) configured to receive an instruction frequency and an adjusting frequency, wherein the controlling frequency being obtained by subtracting an adjusting frequency from the instruction frequency by the first ALU; and
   a speed controller and a second ALU, wherein the speed controller is configured to output the instruction frequency according to a speed difference worked out by the second ALU;
   wherein there is a predetermined relationship between the controlling voltage and the controlling frequency stored in the V/F controller, the controlling voltage is greater than zero in response to the controlling frequency being zero, and increasing the controlling frequency increases the controlling voltage as in the predetermined relationship.

8. A method for controlling an induction motor (IM) comprising:
   receiving a controlling frequency by a voltage/frequency (V/F) controller;
   outputting a controlling voltage corresponding to the received controlling frequency according to a predetermined relationship between the controlling frequency and the controlling voltage by the V/F controller;
   receiving the controlling voltage and the controlling frequency, and generating pulse width modulation (PWM) signals according to the controlling voltage and the controlling frequency by a PWM controller;
   receiving the PWM signals, and controlling the IM according to the PWM signals by a converter;
   detecting the speed and the current of the IM by a detector;
   receiving the current of the IM, and outputting an adjusting frequency according to the current of the IM by a current controller;
   receiving the speed of the IM and an instruction speed, and subtracting the speed of the IM from the instruction speed to obtain a speed difference by a first arithmetic logic unit (ALU);
   receiving the speed difference and outputting an instruction frequency according to the speed difference by a speed controller; and
   receiving the instruction frequency and the adjusting frequency by a second ALU;
   wherein the controlling voltage is greater than zero in response to the controlling frequency being zero, and increasing the controlling frequency increases the controlling voltage as in the predetermined relationship.

9. The method of claim 8, wherein the controlling frequency is obtained by subtracting the adjusting frequency from the instruction frequency by the second ALU.

10. The method of claim 8, further comprising comparing a value of the current of the IM to a threshold current value by the current controller, wherein the adjusting frequency is outputted according to a comparing result of the value of the current of the IM and the threshold current value.

11. The method of claim 8, wherein there is a given frequency value set in the predetermined relationship, wherein a ratio of the controlling voltage to the controlling frequency in the predetermined relationship is variable in response to the controlling frequency being lower than the given frequency value, and the ratio is invariable in response to the controlling frequency being greater than the given frequency value.

12. The method of claim 8, wherein the converter controls the IM according to duty cycles of the PWM signals, values of the duty cycles of the PWM signals are obtained according to the controlling voltage and the controlling frequency by the PWM controller.

* * * * *